(12) United States Patent
Laemmer

(10) Patent No.: US 9,958,248 B2
(45) Date of Patent: May 1, 2018

(54) HIGH SPOT MATERIAL GAUGING DEVICE

(71) Applicant: Rolf G. Laemmer, Franklin, PA (US)

(72) Inventor: Rolf G. Laemmer, Franklin, PA (US)

( * ) Notice: Subject to any disclaimer, the term of this patent is extended or adjusted under 35 U.S.C. 154(b) by 43 days.

(21) Appl. No.: 15/203,933

(22) Filed: Jul. 7, 2016

(65) Prior Publication Data

US 2016/0313111 A1 Oct. 27, 2016

Related U.S. Application Data

(63) Continuation-in-part of application No. 14/132,272, filed on Dec. 18, 2013.

(51) Int. Cl.
| | |
|---|---|
| *G01B 3/30* | (2006.01) |
| *G01B 5/06* | (2006.01) |
| *G01B 1/00* | (2006.01) |
| *G01B 5/14* | (2006.01) |
| *G01B 5/28* | (2006.01) |

(52) U.S. Cl.
CPC .......... *G01B 3/30* (2013.01); *G01B 1/00* (2013.01); *G01B 5/06* (2013.01); *G01B 5/061* (2013.01); *G01B 5/14* (2013.01); *G01B 5/28* (2013.01)

(58) Field of Classification Search
CPC . G01B 5/14; G01B 5/06; G01B 5/061; G01B 1/00; G01B 3/30
USPC .............. 33/1 H, 501.02, 533, 832–834, 836
See application file for complete search history.

(56) References Cited

U.S. PATENT DOCUMENTS

| | | | | |
|---|---|---|---|---|
| 1,909,652 A | * | 5/1933 | Bower ................... | G01B 5/066 33/834 |
| 2,167,652 A | * | 8/1939 | Hoch ..................... | G01N 33/32 33/836 |
| 2,321,441 A | | 6/1941 | Webber | |
| 2,351,105 A | * | 6/1944 | Casali .................... | B25B 27/00 33/567 |
| 2,410,877 A | * | 11/1946 | Hall ....................... | G01B 3/00 33/567 |
| 2,536,401 A | * | 1/1951 | Victor .................... | G01B 3/30 33/567 |
| 2,715,830 A | | 7/1952 | Lewis et al. | |
| 2,626,466 A | * | 1/1953 | Stanton ............. | B23Q 17/0942 33/202 |
| 2,676,413 A | * | 4/1954 | Wharton ................ | B23Q 1/01 269/297 |
| 2,760,271 A | * | 8/1956 | Morat ................... | G01B 5/0004 33/838 |
| 2,966,194 A | | 12/1960 | Day | |
| 3,636,797 A | | 1/1972 | Moore | |
| 3,896,555 A | * | 7/1975 | Lutz ....................... | A41H 31/00 269/287 |

(Continued)

*Primary Examiner* — R. A. Smith
*Assistant Examiner* — Tiana Courson

(57) ABSTRACT

A high spot material gauging device applies high spot detection material in multiple depths to provide a basis for correctly determining a depth of material to be removed to produce a planar surface. The device includes a block having a planar first face. Each of a plurality of channels extends into the first face of the block. Each channel has a planar bottom surface parallel to the face of the block. The bottom surface of each channel is a unique respective depth measured transversely from the face of the block such that each channel is configured for applying a unique thickness of high spot material onto a planar control surface.

14 Claims, 2 Drawing Sheets

(56) References Cited

U.S. PATENT DOCUMENTS

| | | | | |
|---|---|---|---|---|
| 4,177,570 | A | * | 12/1979 | Hewitt ..................... G01B 3/30 |
| | | | | 33/199 R |
| 4,607,305 | A | * | 8/1986 | Milo ........................ G11B 5/29 |
| | | | | 29/603.05 |
| 5,031,314 | A | | 7/1991 | Berrong et al. |
| 5,063,682 | A | | 11/1991 | Boissevain et al. |
| 6,026,586 | A | * | 2/2000 | Waddles ................ G01B 5/066 |
| | | | | 33/1 H |
| 6,338,203 | B1 | * | 1/2002 | Strickland .............. B25H 7/005 |
| | | | | 33/529 |
| D686,926 | S | * | 7/2013 | Moe .............................. D10/62 |
| 9,097,506 | B2 | * | 8/2015 | Shapiro ................... G01B 3/04 |
| D742,261 | S | * | 11/2015 | Halker .......................... D10/64 |
| 2004/0121699 | A1 | * | 6/2004 | Ladner ................. A63H 33/082 |
| | | | | 446/85 |

* cited by examiner

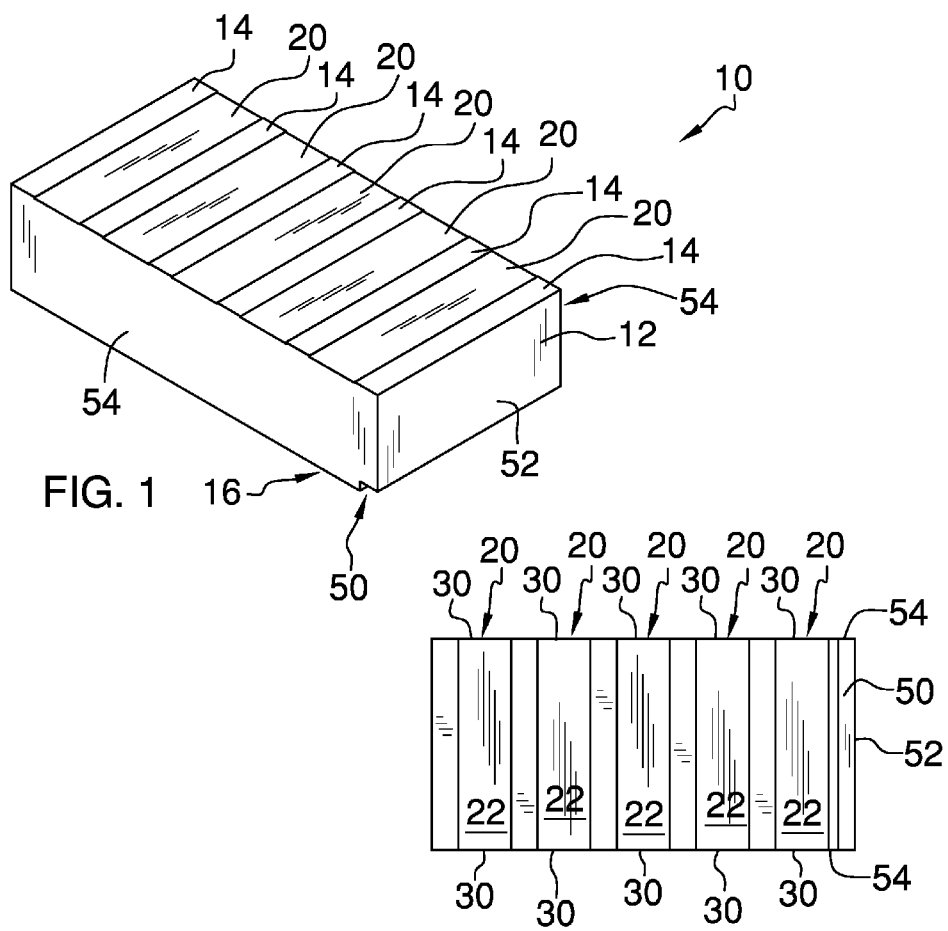

HIGH SPOT MATERIAL GAUGING DEVICE

CROSS-REFERENCE TO RELATED APPLICATIONS

This application is a continuation in part of application Ser. No. 14/132,272 filed Dec. 18, 2013.

BACKGROUND OF THE DISCLOSURE

Field of the Disclosure

The disclosure relates to gauging devices and more particularly pertains to a new gauging device for applying high spot detection material in multiple depths to provide a basis for correctly determining a depth of material to be removed.

SUMMARY OF THE DISCLOSURE

An embodiment of the disclosure meets the needs presented above by generally comprising a block having a planar first face. Each of a plurality of channels extends into the first face of the block. Each channel has a planar bottom surface parallel to the face of the block. The bottom surface of each channel is a unique respective depth measured transversely from the face of the block such that each channel is configured for applying a unique thickness of high spot material onto a planar control surface.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein:

FIG. 1 is a top front side perspective view of a high spot material gauging device according to an embodiment of the disclosure.

FIG. 2 is a top view of an embodiment of the disclosure.

FIG. 3 is an exaggerated front view of an embodiment of the disclosure.

DESCRIPTION OF THE PREFERRED EMBODIMENT

Figure 4:
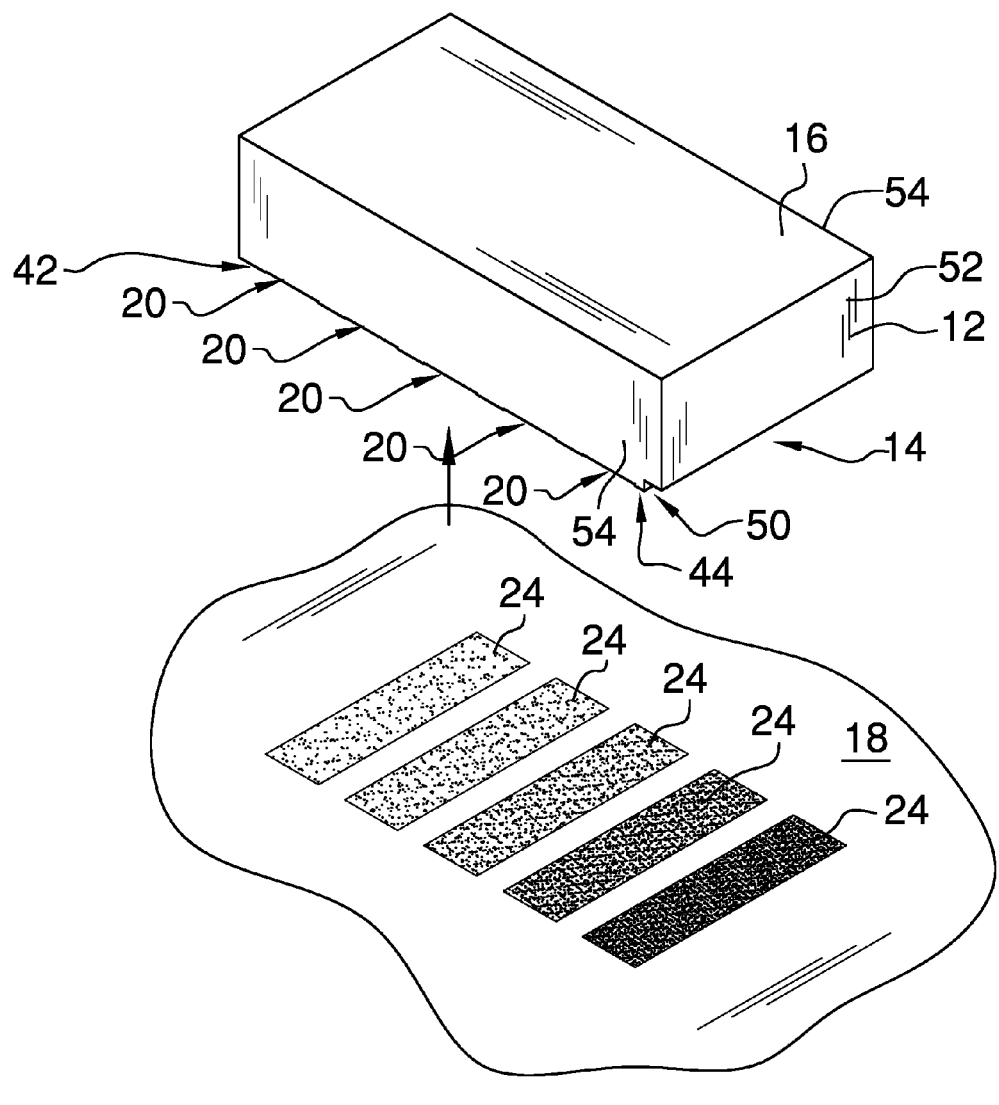
FIG. 4 is an exploded bottom front side perspective view of an embodiment of the disclosure in use.

With reference now to the drawings, and in particular to FIGS. 1 through 4 thereof, a new gauging device embodying the principles and concepts of an embodiment of the disclosure and generally designated by the reference numeral 10 will be described.

As best illustrated in FIGS. 1 through 4, the high spot material gauging device 10 generally comprises a block 12 having a first face 14. The first face 14 is planar. The block 12 may further comprise a second face 16 positioned aligned with the first face 14 wherein the second face 16 is configured for urging the first face 14 against a planar control surface 18 when a force is applied to the second face 16. Each of a plurality of channels 20 extends into the first face 14 of the block 12. The channels 20 may be parallel to each other and closely spaced. Each channel 20 has a bottom surface 22. The bottom surface 22 of each channel 20 is planar and parallel to the first face 14 of the block 12. The bottom surface 22 of each channel 20 is a unique respective distance measured transversely from the first face 14 of the block 12. Each channel 20 may have respective parallel opposed sides 26 wherein a transverse cross-sectional shape 28 of each channel 20 is rectangular and of consistent size extending across the block 12. Thus, each channel 20 is configured for applying a unique and consistent thickness of a high spot material 24 onto the planar control surface 18 when the block 12 is pressed against the control surface 18. The high spot material 24 is of a conventional type used by applying the high spot material 24 to a known planar surface which is then compressed against a second surface. The high spot material 24 transfers to the second surface and pools in gaps between the known planar surface and the second surface revealing undulations in the second surface. The high spot material 24 is commonly provided in a color such as blue to enhance the appearance and facilitate viewing of the undulations in the second surface. Application of the high spot material 24 to the first face 14 of the block and into each channel 20 allows transfer of the high spot material 24 to the control surface 18 producing known depths of the high spot material 24 based on the unique distances between each bottom surface 22 and the first face 14. The high spot material 24 will produce a different appearance based on the thickness of the high spot material 24 positioned on the control surface 18. Thus, when the high spot material 24 is used in conventional fashion to reveal undulations in the second surface as described above, the appearance of the high spot material 24 in the undulations can be compared to the high spot material 24 on the control surface 18 to indicate the depth of the undulations. This allows for more efficient and accurate subsequent work to remove the undulations from the second surface.

Each channel 20 may extend fully across the first face 14 of the block 12 wherein each channel 20 has a pair of open ends 30. The open ends 30 may facilitate removal of excess high spot material 24 from the respective channels 20. There may be exactly five channels 20. A depth of a first one of the channels 20 may be between 1.0 and 3.0 micrometers. The depth of each channel 20 is a uniform incremental increase and may be a multiple or more particularly a whole number multiple of the depth of the first one of the channels 20 facilitating accurate estimations of undulation depth by visual inspection of adjacently positioned channels 20. Stated in an alternative manner, each unique respective depth of the channels 20 may be evenly distributed between an initial depth 42 and a terminal depth 44 within a desired range in which the initial depth is between 1.0 and 3.0 micrometers.

A cutout 50 extends into the first face 14 along a side face 52 of the block 12 wherein the cutout 50 is configured for receiving a prying tool for facilitating removal of the block 12 from against the planar control surface 18. The side face 52 extends between two longitudinal sides 54 of the block 12. The cutout 50 extends a full length between the longitudinal sides 54 of said block 12. The cutout 50 has a rectangular cross-sectional shape parallel to a longitudinal axis of the block 12. The side face 52 is adjacent to a deepest one of the channels 20 having the terminal depth 44.

In use, the device 10 provides for a method of gauging high spot material depth as described above. The device 10 facilitates efficient removal of excess material to produce a desired planar surface.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A high spot material gauging device comprising:
   a block having a first face, said face being planar, said block having a cutout extending into said first face along a side face of said block wherein said cutout is configured for receiving a prying tool for facilitating removal of said block from against a planar control surface; and
   a plurality of channels extending into said first face of said block, each said channel having a bottom surface, said bottom surface of each said channel being planar, said bottom surface of each said channel being parallel to said face of said block, said bottom surface of each said channel being a unique respective depth measured transversely from said face of said block wherein each said channel is configured for applying a unique thickness of high spot material onto the planar control surface, said side face being adjacent to a deepest one of said channels.

2. The device of claim 1, further comprising each said channel extending fully across said first face of said block wherein each said channel comprises a pair of open ends.

3. The device of claim 1, further comprising said block having a second face, said second face being positioned aligned with said first face wherein said second face is configured for urging said first face against the planar control surface when a force is applied to said second face.

4. The device of claim 1, further comprising said plurality of channels being five channels.

5. The device of claim 4, further comprising each unique respective depth of said plurality of channels being evenly distributed between an initial depth and a terminal depth.

6. The device of claim 5, further comprising said initial depth being between 2.0 and 3.0 micrometers.

7. The device of claim 1, further comprising a depth of a first one of said channels being between 1.0 and 3.0 micrometers.

8. The device of claim 7, further comprising said depth of each said channel being a uniform incremental increase relative to an adjacently positioned said channel.

9. The device of claim 7, further comprising said depth of each said channel being a whole number multiple of said depth of said first one of said channels.

10. The device of claim 1, further comprising each said channel having respective parallel opposed sides wherein a transverse cross-sectional shape of each said channel is rectangular.

11. The device of claim 1, further comprising said side face extending between two longitudinal sides of said block.

12. The device of claim 11, further comprising said cutout extending a full length between said longitudinal sides of said block.

13. The device of claim 1, further comprising said cutout having a rectangular cross-sectional shape parallel to a longitudinal axis of said block.

14. A high spot material gauging device comprising:
    a block having a first face, said first face being planar, said block having a second face, said second face being positioned aligned with said first face wherein said second face is configured for urging said first face against a planar control surface when a force is applied to said second face; and
    a plurality of channels extending into said first face of said block, each said channel having a bottom surface, said bottom surface of each said channel being planar, said bottom surface of each said channel being parallel to said first face of said block, said bottom surface of each said channel being a unique respective depth measured transversely from said first face of said block wherein each said channel is configured for applying a unique thickness of high spot material onto a planar control surface, each said channel having respective parallel opposed sides wherein a transverse cross-sectional shape of each said channel is rectangular, each said channel extending fully across said first face of said block wherein each said channel comprises a pair of open ends, said plurality of channels being five channels;
    a depth of a first one of said channels being between 2.0 and 3.0 micrometers, said depth of each said channel being a whole number multiple of said depth of said first one of said channels; and
    a cutout extending into said first face along a side face of said block wherein said cutout is configured for receiving a prying tool for facilitating removal of said block from against said planar control surface, said side face extending between two longitudinal sides of said block, said cutout extending a full length between said longitudinal sides of said block, said cutout having a rectangular cross-sectional shape parallel to a longitudinal axis of said block, said side face being adjacent to a deepest one of said channels.

* * * * *